United States Patent
Barker

(10) Patent No.: US 7,447,157 B2
(45) Date of Patent: Nov. 4, 2008

(54) ALARM SIGNAL SUPPRESSION IN TELECOMMUNICATIONS NETWORKS

(75) Inventor: Andrew James Barker, Attenborough (GB)

(73) Assignee: Ericsson AB, Stockholm (SE)

(*) Notice: Subject to any disclaimer, the term of this patent is extended or adjusted under 35 U.S.C. 154(b) by 804 days.

(21) Appl. No.: 10/466,669

(22) PCT Filed: Jan. 16, 2002

(86) PCT No.: PCT/GB02/00177

§ 371 (c)(1),
(2), (4) Date: Jan. 9, 2004

(87) PCT Pub. No.: WO02/058297

PCT Pub. Date: Jul. 25, 2002

(65) Prior Publication Data

US 2004/0114526 A1      Jun. 17, 2004

(30) Foreign Application Priority Data

Jan. 16, 2001   (GB)   .................... 0101119.6

(51) Int. Cl.
*H04L 1/00*     (2006.01)
*G06F 11/00*    (2006.01)

(52) U.S. Cl. .......................................... 370/242; 714/4

(58) Field of Classification Search ................. 370/245, 370/546
See application file for complete search history.

(56) References Cited

U.S. PATENT DOCUMENTS

| 5,212,475 A * | 5/1993 | Thoma ....................... 340/2.4 |
| 5,636,206 A   | 6/1997 | Amemiya et al. |
| 5,717,693 A * | 2/1998 | Baydar et al. ............... 370/514 |
| 6,239,699 B1* | 5/2001 | Ronnen ...................... 340/517 |
| 6,385,665 B1* | 5/2002 | Canady et al. ................. 710/2 |
| 6,414,940 B1* | 7/2002 | Shah et al. .................. 370/242 |
| 6,775,283 B1* | 8/2004 | Williams .................... 370/392 |

FOREIGN PATENT DOCUMENTS

| JP | 01307330 |   | 12/1989 |
| JP | 04020135 |   | 2/1992 |
| JP | 04020157 |   | 2/1992 |
| JP | 05103046 |   | 4/1993 |
| JP | 07307715 | * | 5/1994 |
| JP | 07307715 |   | 11/1995 |

* cited by examiner

*Primary Examiner*—Chau Nguyen
*Assistant Examiner*—Timothy J Weidner
(74) *Attorney, Agent, or Firm*—Kirchstein, et al.

(57) ABSTRACT

In a synchronous communications network such as SDH or SONET, traffic signals can be tagged to indicate that a fault condition has already been identified and reported. On examination of the alarm tag at subsequent stages, an alarm is suppressed if the tag indicates that the fault has already been reported.

14 Claims, 5 Drawing Sheets

ALARM SIGNAL SUPPRESSION IN TELECOMMUNICATIONS NETWORKS

BACKGROUND OF THE INVENTION

This invention relates to telecommunications networks and in particular to the handling, suppression, of alarms generated in network elements, such as are used, for example, within the SDH (Synchronous Digital Hierarchy) and SONET (Synchronous Optical Network Technologies) high-speed optical transmission technologies and other transmission systems.

SDH and SONET are high-speed transmission networks used, for example, in a telecommunications carrier's core network. The carrier may offer a diverse range of services which are continuously transmitted. The individual data is multiplexed into higher speeds and transmitted at speeds typically of 2.5 Gbps and above. Data is sent in time division multiplexed containers. Where no data is to be sent, an idle pattern is transmitted. There is a constant delay between each container. Full details of the SONET specification are set out in ANSI (American National Standards Institute) standard GR253 and of the SDH specification in the ITU-T (International Telecommunications Union) G709 Standard.

FIG. 1 shows a typical known network element comprising a pair of traffic cards 10, 12 shown as traffic card A and traffic card B. These cards pass data between themselves via a switch 14, which is connected to the traffic cards through traffic interfaces. Both the cards and the switch are connected to a controller card 16 via control interfaces and the controller card communicates with a remote management system. Examples of the network element shown may be found in many commercially available products including add-drop multiplexers sold under the trademarks SMA-1 Series 3, SMA-4 Series 3 and MSH 11c by Marconi Communications Limited of Coventry, England.

The traffic cards monitor themselves and also the traffic flow to determine and report fault conditions. Such fault conditions are signalled over the control interface to the controller card where they are processed and sent to the remote management system.

A single fault occurrence, particularly with regard to traffic, can cause alarms on many cards. Some of these will be as a direct consequence to others. Referring again to FIG. 1, network traffic arriving on traffic card A is passed to the switch 14, and routed to network card B to be sent out to the network. If the traffic source to card A fails, that card will detect the fault and generate an alarm signal. Traffic card B will also detect the fault and generate an alarm signal even though the fault is the failure of traffic to reach card A, which fault has already been detected and reported by card A. Thus, a single failure can cause more than one alarm to be generated with some of the alarms being generated by cards not directly affected by the fault. This leads to unnecessary alarm signals being reported to the controller and then to the management system. This is undesirable as it places an additional load on the communications interface to the management systems, imposes additional alarm processing requirements on the management system and additional complications to fault finding.

A known method of reducing the number of unnecessary alarms uses alarm consequential suppression. A hierarchical tree of alarms is used with lower level alarms being a consequence of higher level alarms. When a card processes alarms for onwards transmission, any lower level alarms are suppressed in the presence of a related higher level alarm. Suppression is dictated by the relationship contained in a suppression tree.

Such an arrangement works well on a single card. However, when functions are spread across a plurality of cards, for example, the two cards A and B in FIG. 1, the cards will act as single entities which have suppression trees that are exclusive of each other. They can, therefore, only suppress those alarms which are contained within themselves.

An alternative approach to alarm suppression correlates alarms across multiple cards and suppresses alarms at this level. This is possible as all alarms are collated by a control function and/or a management system. This correlation is preferably performed at the controller card that is local to each network element, to prevent multiple alarms being sent over the communications network. The solution has the disadvantage of being processor intensive.

There is, therefore, a need for an improved method and apparatus for handling alarm conditions in network elements which in part, at least, overcomes this problem.

SUMMARY OF THE INVENTION

In its broadest form, the invention inserts an alarm tag into the signal when it is first detected. This tag is passed through the network and, when detected, causes the alarm to be suppressed. Thus, the alarm is only generated at the first instance of fault detection and secondary alarms are suppressed.

More specifically, there is provided a method of suppressing generation of secondary alarms in a telecommunications network, comprising: inserting an alarm tag into a traffic signal at the source of a fault detection, the alarm tag indicating to the network that the fault has been detected and reported.

The invention also provides apparatus for suppressing generation of secondary alarms in a telecommunications network having a plurality of network elements, the apparatus comprising: an alarm tag inserter for inserting an alarm tag into a traffic signal at the source of a fault detection, the alarm tag comprising an indication to subsequent network elements that the fault has been detected and reported.

The invention further provides a communications signal for communication through a network having a plurality of network elements, the signal comprising: a data portion and a descriptive portion describing parameters relating to the data and its path through the communications network, the descriptive portion including an alarm tag inserted at the source of detection of a fault and indicating to network elements that the fault has been detected and reported.

Embodiments of the invention have the advantage that secondary alarms generated on subsequent network cards to the first alarm are suppressed. This can greatly reduce the number of alarms generated and so reduce the processing required. Furthermore, as only a single alarm is generated for a given fault, the source of that fault is more easy to trace and localise.

Embodiments of the invention have the further advantage that traffic errors detected at more than one network element, or more than one card within a network element, are reported only once.

Preferably, where the network transmits signals in a synchronous format, such as for example SDH or SONET formats, in which traffic is sent in virtual containers, each container having a path overhead and a signal portion, the alarm tag is inserted into the path overhead.

Preferably, where the traffic forms part of an internal frame switched with the traffic, the alarm tag is inserted into the internal frame.

Preferably, where the traffic is packetized data, the alarm tag is inserted as a wrapper around the data in the packets.

Preferably, a persistence is applied to tags to prevent false alarms being generated.

Each of the preferred embodiments mentioned above have the advantage that the alarm tag does not affect the traffic and is invisible outside the network elements.

According to a second aspect of the invention there is provided apparatus for suppressing generation of secondary alarms in a telecommunications network having a plurality of traffic cards, the apparatus comprising: an alarm tag inserter for inserting an alarm tag into a traffic signal at the source of a fault detection, the alarm tag comprising an indication to subsequent traffic cards that the fault has been detected and reported.

BRIEF DESCRIPTION OF THE DRAWING

Embodiments of the invention will now be described, by way of example only, and with reference to the accompanying drawings, in which.

DETAILED DESCRIPTION OF THE PREFERRED EMBODIMENT

Figure 2:
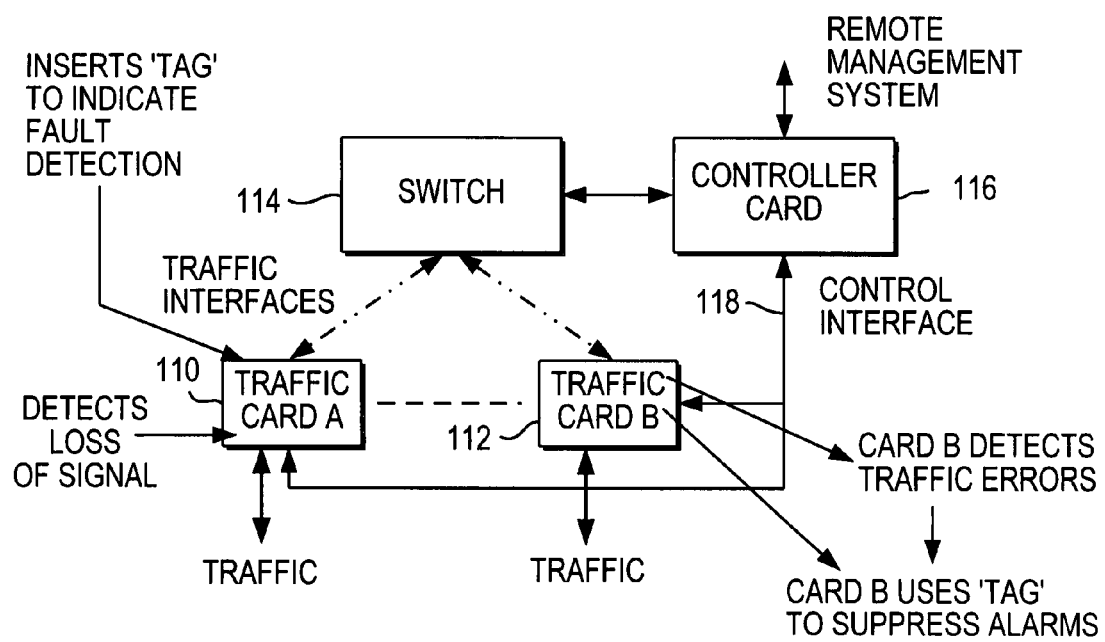
FIG. 2 is a view similar to FIG. 1, and illustrating an embodiment of the invention.
Figure 3:
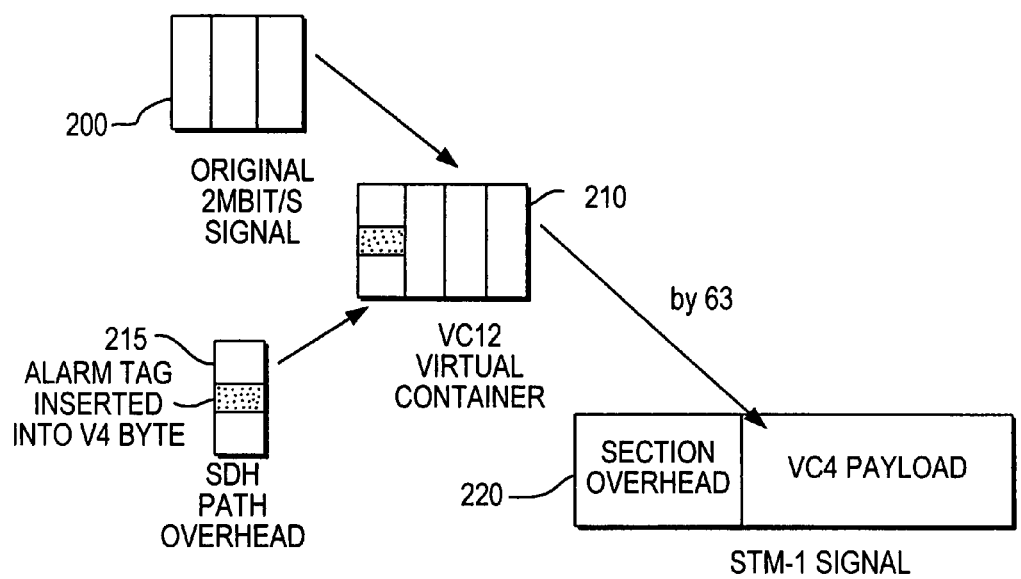
FIG. 3 is a schematic representation of the SDH/SONET container.

Referring now to FIGS. 2 and 3, the invention addresses the problem of multiple alarm reporting by tagging each traffic path with additional information. This information relates to the detected stated of the path as detected by the card that is processing it. This tagged path status information is carried with the traffic as it passes through the network so that subsequent cards can examine the tag and, based on its content, determine whether a fault has already been determined by another card on the network If it has, no further reporting of that fault is necessary and the subsequent card uses the tagged information to suppress any alarms it detects that it knows are as a result of a higher related level alarm. These alarms may be referred to as secondary alarms. It can be seen that this approach still enables alarms to be collated and suppressed but it removes the need for the higher level control function to perform the correlation and the associated additional processing requirement.

In FIG. 2, the two traffic cards are referred to by the numerals 110, 112, the switch by 114 and the controller card by 116. The remote management function is not shown and the connection are the same as FIG. 1.

Consider the case where network card A 110 detects a loss of signal at its input. It will report this loss of signal to the controller on line 118. In addition, it will insert a source tag into the affected traffic or traffic path to indicate to other cards in the system that a fault condition exists. This is possible in a synchronous system such as SDH or SONET as a container is sent at regular intervals regardless of whether any data is present to be sent.

At card B 112, traffic faults which would normally cause an alarm to be raised are detected. However, before the alarm is raised, the tag associated with the determined traffic fault is inspected. If it shows that a higher level fault has been detected and alarmed already it can suppress reporting of its own detected faults.

It will be appreciated that the tag must not affect the traffic itself and should not be visible outside the equipment. FIG. 3 shows the structure of the SDH container. In this example, 2 Mbit/s signal data is being sent through the system. The original 2 Mbit/s signal 200 has an SDH path overhead 215 added to it as a header to form the SDH virtual container 210. This header contains various descriptive data describing the data content, destination, error checking, data labels etc as set out in the ITU-T G709 standard referred to previously. The header includes a single byte, referred to as the V4 byte, which is user configurable and which does not have a prescribed function within the ITU-T G709 standard. This byte is used to carry the reported alarm tag. The SDH standard requires that the V4 byte is terminated in the equipment and reinserted as the traffic leaves the equipment. This makes it suitable for carrying the reported alarm tag as a given card can terminate the V4 byte on receipt. Insert a new byte on detection and reporting of a fault, and then reinsert the new byte into the traffic. In the example shown in FIG. 3, the signal is completed by adding a section overhead 220 to the virtual container 210.

In a second embodiment, the traffic is part of an internal frame which is carried within the equipment. The tag may be inserted within this internal frame provided that the frame is switched with the traffic.

Figure 1:
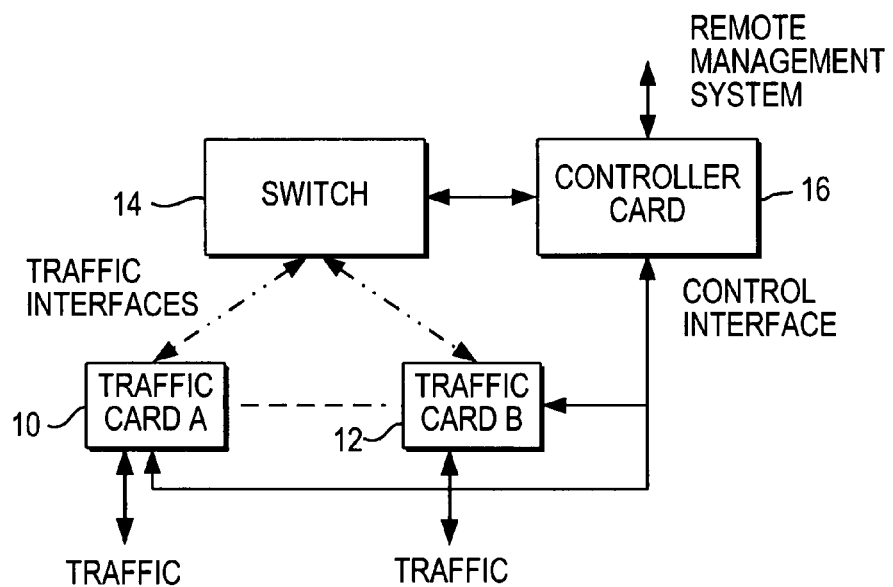
FIG. 1, referred to previously, is a schematic view of a known network element.

In the FIG. 3 example, the signal VC12 is small, referred to as "low order" and is switched as a standalone unit. Thus the frame in which it enters the switch, eg from card 10 to switch 14 in FIG. 1 is not switched with it. This would not make sense as there may be up to 63 VC12 signals in the frame.

Figure 4:
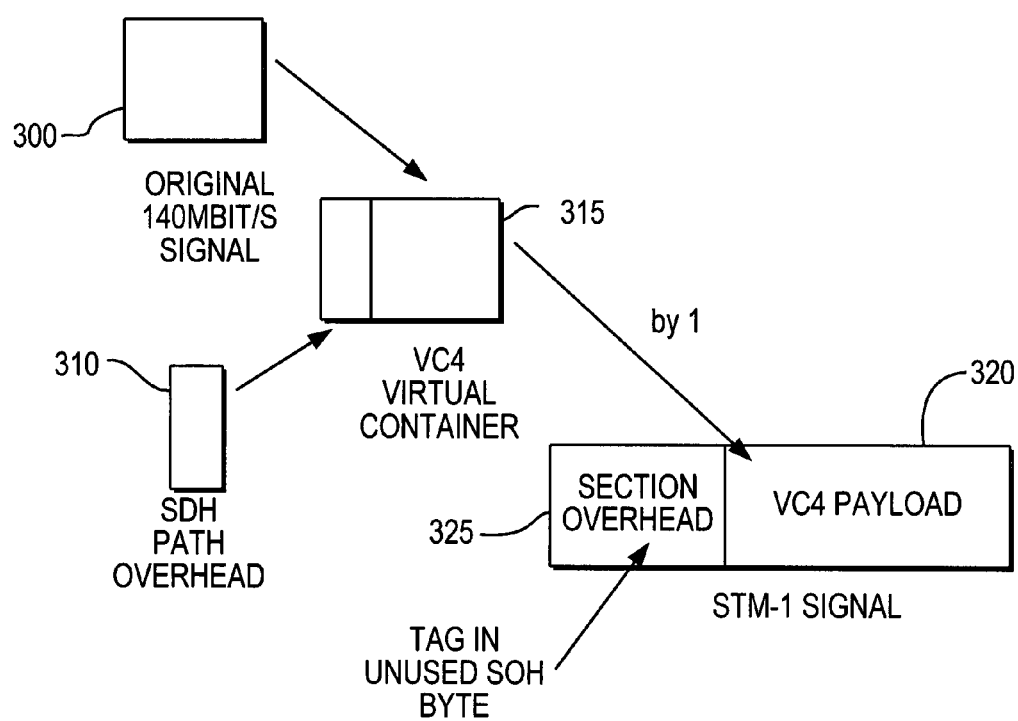
FIG. 4 is a schematic representation of the application of a tag to a frame.

In the case of larger signals, however, it can make sense to switch the frame with the signal. In SDH, there is a VC4 which contains one 140 Mbit/s signal. The frame that carries the signal from the card 10 to the switch 14 is now only associated with this single signal. As such, it is possible, and relevant, to switch the whole frame across the switch. In this case the tag can be located in the frame rather than the overhead of the VC4 signal. This is important as in the VC4 signal there is no readily available path overhead byte to use. This arrangement is shown in FIG. 4 in which the original 140 Mbit/s signal 300 has an SDH path overhead 310 added to it to form a VC4 virtual container 315. The STM-1 signal 320 is formed by adding the section overhead 325. The tag is contained in an unused byte of the section overhead.

A third embodiment of the tag is suitable where the data transported by the virtual containers is packetized data such as ATM or IP data. The tag can be inserted into a wrapper which is added to the digital data while it is in the equipment. The wrapper may be, for example, an additional 2 bytes at the beginning and a single byte at the end of the data packet. One or more of these additional words comprises the tag. The difference between the wrapper and the example of FIG. 3 is that the wrapper forms a part of the signal data and not the path overhead. As the signal data is packetized, and the packets already include descriptive headers, the wrapper can be inserted without affecting the traffic. Wrappers are required as packet systems are not synchronous. In SDH or SONET they can be carried in virtual containers but this is not necessary.

Packet system are asynchronous with each packet carrying a number of bytes. The packets can be carried at any transmission bit rate, the impact being how quickly it can be done.

Therefore, a packet may be carried over a number of links in travelling between two points, each link being at a different bit rate. Where there are short periods where too much data is received for the speed of the link, the data is temporarily stored in buffers.

The limiting factor for an end to end path is the lowest speed link in the path. In a normal network, the data rates are set such that the lowest rates are at the costumer end, with the fastest rates in the core network to prevent the core being the problem. However, the core carries many customers' data. The delay through the network is not guaranteed. Variable buffering will occur depending on network loading. This presents problems in handling voice and video over packet systems where delay variation is critical.

As date rates are not fixed, data can be added to packets in the form of a wrapper which can be used to tag the packet, especially were the wrapper is added and removed completely within the equipment.

Figure 5:
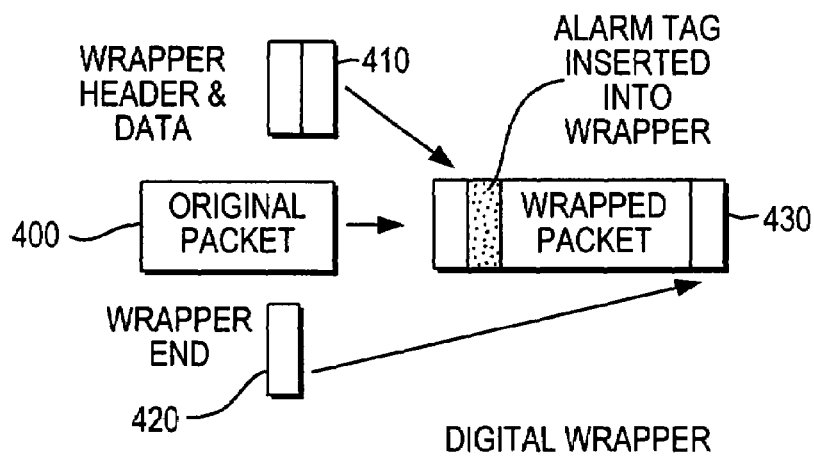
FIG. 5 is a schematic representation of the application of a tag in a wrapper around packetized data.

The example given above, of two bytes at the beginning of the packet and one at the end is shown in FIG. 5. The original packet 400 has added to it the wrapper header and data 410 and the wrapper end 420 to form the wrapped packet 430. The two bytes at the beginning comprise the header byte and data byte and the byte at the end comprises an end byte. As the packet transmission rate is variable, by making the internal data rate used after wrapping slightly faster than the input/output rates of the packet, there are no detectable delays caused by adding the wrapper.

The advantages of the embodiments described may be appreciated from a consideration of the following example. An SDH STM-16 system receives traffic at 2.5 Gbits/s and switches that traffic onto 2 Mbit/s traffic signals. If the 2.5 Gbit/s line interface fails, an alarm condition will be reported. In the embodiment of the invention described, there will be a single alarm within the system with the remaining alarms at each of the tributary cards suppressed. In the prior art systems, there will be a single alarm from the 2.5 Gbit/s card and 1008 alarms from the 2 Mbit/s cards.

In each of the embodiments described above, the traffic may be protected. The cards of the network element may see a temporary traffic fault as well as a temporary indication in the tag before the protection switch takes place. As the nature of recovery after the protection switch is variable, the card may see the tag indication clear before the traffic fault. This would cause the card temporarily to raise an alarm. In order to prevent this, the card applies a suitable persistence to the on and/or off times of the alarm and tag indication to prevent false reporting, the persistence being chosen to overcome any variation caused by protection switching.

Figure 6:
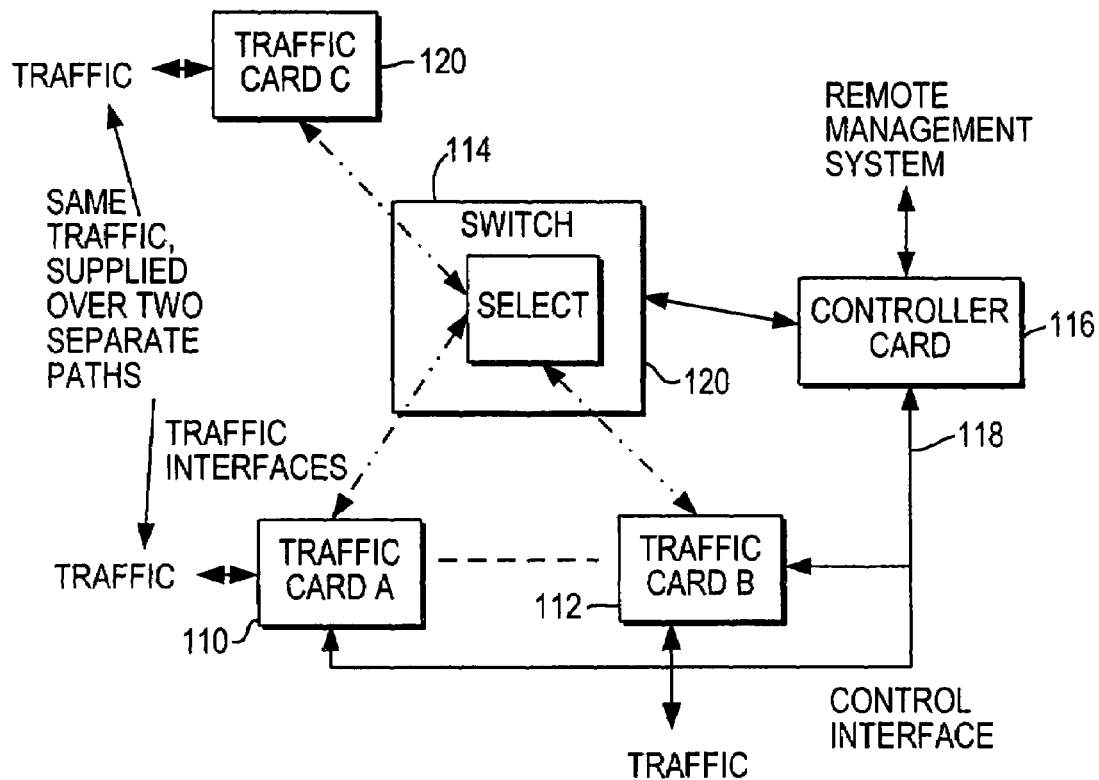
FIG. 6 is a variant of FIG. 2 showing how false alarms may be generated and corrected.

Thus, persistence is intended to avoid false alarms. In an unprotected system, once traffic is lost it will be lost for some time, and alarms are relevant. Many system, however, are protected. If traffic from one source fails; it is replaced by an alternative source. This is illustrated in FIG. 6 which is similar to FIG. 2 but includes a third traffic card C 120. This card has the same traffic supplied to it as card A 110 by over a different path. The system selects the best path to traffic card B, 112. If one fails it is replaced by the other. To make the selection, the switch 114 includes a selector 122 which selects between cards A and C.

Consider now the case where card A, 110 has been selected to send to card B, 112. The traffic on card A now fails. Card A generates an alarm and inserts a tag into the overhead to inform card B to suppress alarms. The switch now selects card C to send traffic to card B. As C has always had good traffic it will not include a tag to suppress alarms on B. However, while good traffic is being sent to card B, due to the need to align pointers and their rearrangements with B, it may see the traffic as bad for a short while. The tag is effectively instant so while card B sees B traffic it thinks is bad, there is no tag to cause suppression. Card B will therefore generate alarms that will disappear very quickly once it has aligned to the traffic pointers and carried out whatever other internal reorganisation is required.

Thus, fleeting alarms can be raised which are undesirable. Persistence can avoid this. Instead of accepting tag conditions as instant on or off conditions, the traffic card persists the condition for a fixed time to ensure it is not transitory. In the example considered, the alignment time for card B to the new traffic source may be assumed to be 20 ms. If the card has a persistence of 50 ms before accepting any change it will continue to suppress alarms for 50 ms after the tag restores. By this time card B will have realigned to the new traffic source, having seen that it is good and not generate an alarm.

Figure 7:
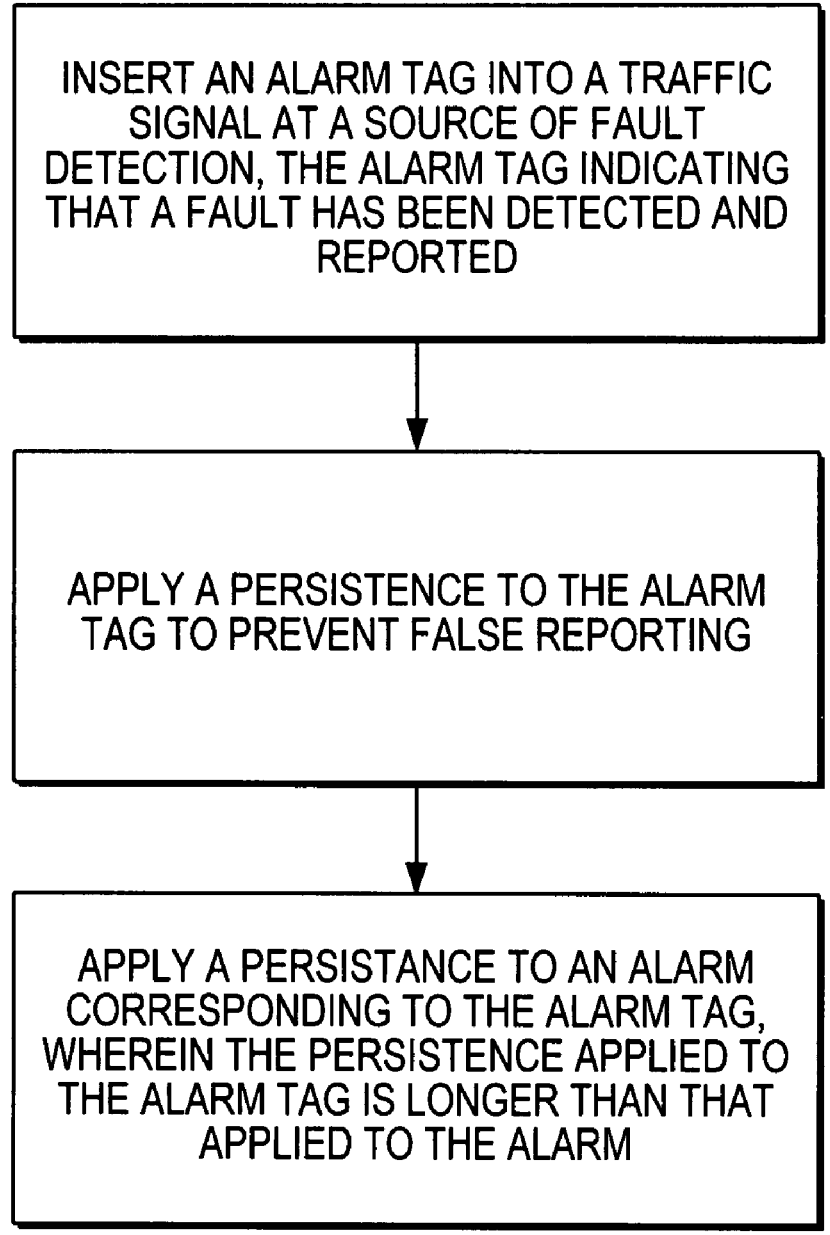
FIG. 7 is a flow chart depicting the method of this invention.

Persistence applies only to the tag but it is desirable to apply persistence to alarms as well to prevent spurious alarms. In such a case it is important to balance the size of persistence. If the alarm is persisted for longer than the tag the problem discussed above will still occur, since the tag will be deemed clear before the alarm. It follows, therefore, that tag persistence should be longer than alarm persistence, as indicated in FIG. 7.

Many modifications are possible to the embodiments described and will occur to those skilled in the art without departing from the invention which is defined by the appended claims.

The invention claimed is:

1. A method of suppressing generation of secondary alarms in a telecommunications network, comprising the steps of: inserting an alarm tag into a traffic signal at a source of a fault detection, the alarm tag indicating to the network that a fault has been detected and reported, receiving the traffic signal comprising the alarm tag at a traffic card, and applying, at the traffic card, a first persistence to at least one of an on time and an off time of the alarm tag and a second persistence to at least one of an on time and an off time of an alarm corresponding to the alarm tag, and wherein the first persistence applied to the at least one of an on time and an off time of the alarm tag is longer than the second persistence applied to the at least one of an on time and an off time of the alarm.

2. The method according to claim 1, wherein the inserting step is performed at a traffic card where the fault is first detected.

3. The method according to claim 2, and further comprising the step of examining a signal received at subsequent traffic cards for a presence of an alarm tag and, if an alarm tag is detected, suppressing generation of an alarm corresponding to the fault to which the alarm tag relates.

4. The method according to claim 1, wherein the network is a synchronous network sending traffic in virtual containers, each container having a path overhead and a signal portion, and wherein the alarm tag is inserted into the path overhead of the container.

5. The method according to claim 4, wherein the alarm tag is inserted into a user configurable byte of the path overhead.

6. The method according to claim 1, wherein the network has traffic which is part of an internal frame switched with the traffic, and wherein the alarm tag is inserted into the internal frame.

7. The method according to claim 1, wherein the network has traffic which is sent as packetized data, and wherein the alarm tag is inserted as a wrapper around the data in packets.

8. An apparatus for suppressing generation of secondary alarms in a telecommunications network having a plurality of traffic cards, the apparatus comprising: an alarm tag inserter for inserting an alarm tag into a traffic signal at a source of a fault detection, the alarm tag comprising an indication to a traffic card receiving the traffic signal comprising the alarm tag that a fault has been detected and reported, wherein said traffic card receiving the traffic signal applies a first persistence to at least one of an on time and an off time of the alarm tag and a second persistence to at least one of an on time and an off time of an alarm corresponding to the alarm tag, and wherein the first persistence applied to the at least one of an on time and an off time of the alarm tag is longer than the second persistence applied to the at least one of an on time and an off time of the alarm.

9. The apparatus according to claim 8, wherein the alarm tag is inserted at a traffic card where the fault is first detected.

10. The apparatus according to claim 8 and further comprising, at each traffic card, means for examining a received signal for a presence of the alarm tag, and an alarm suppressor for suppressing generation of an alarm in relation to the fault if examination of the received signal has found the alarm tag corresponding to the fault.

11. The apparatus according to claim 8, wherein the network is a synchronous network sending traffic in virtual containers, each container having a path overhead and a signal portion, and wherein the alarm tag inserter inserts the alarm tag into the path overhead.

12. The apparatus according to claim 11, wherein the alarm tag inserter comprises means for terminating a user configurable byte from the path overhead of the traffic signal and for inserting the alarm tag in its place as the traffic leaves the traffic card.

13. The apparatus according to claim 8, wherein the network has traffic which is part of an internal frame switched with the traffic, and wherein the alarm tag inserter inserts the alarm tag into the internal frame.

14. The apparatus according to claim 8, wherein the network has traffic which is sent as packetized data, and wherein the alarm tag inserter inserts the alarm tag as a wrapper around the data in packets.

* * * * *